United States Patent
Fleure et al.

(10) Patent No.: US 8,427,900 B2
(45) Date of Patent: Apr. 23, 2013

(54) METHOD FOR DEPLOYMENT OF SEISMIC RECORDER ARRAY WITH REMOVABLE DATA RECORDERS

(75) Inventors: Thomas J. Fleure, Missouri City, TX (US); Craig Lindberg, League City, TX (US); Ralph B. Muse, Dallas, TX (US); Joe Davis, San Antonio, TX (US); Damir S. Skerl, Houston, TX (US); Justin N. Farrelly, Carrollton, TX (US)

(73) Assignee: Global Geophysical Services, Inc.

( * ) Notice: Subject to any disclaimer, the term of this patent is extended or adjusted under 35 U.S.C. 154(b) by 412 days.

(21) Appl. No.: 12/789,088

(22) Filed: May 27, 2010

(65) Prior Publication Data

US 2011/0292758 A1    Dec. 1, 2011

(51) Int. Cl.
   *G01V 1/38* (2006.01)

(52) U.S. Cl.
   USPC ............................................ 367/15; 367/20

(58) Field of Classification Search .................. 367/15
   See application file for complete search history.

(56) References Cited

U.S. PATENT DOCUMENTS

| | | | |
|---|---|---|---|
| 3,923,121 A * | 12/1975 | Kruppenbach et al. | 181/112 |
| 3,954,154 A * | 5/1976 | Kruppenbach et al. | 181/112 |
| 3,972,019 A | 7/1976 | Bassett | |
| 4,281,403 A | 7/1981 | Siems et al. | |
| 4,450,543 A | 5/1984 | Neeley | |
| 4,839,613 A | 6/1989 | Echols et al. | |
| 5,561,640 A | 10/1996 | Maciejewski | |
| 5,847,613 A | 12/1998 | Langlet et al. | |
| 6,024,344 A | 2/2000 | Buckley et al. | |
| 6,081,163 A | 6/2000 | Ujiie et al. | |
| 6,584,406 B1 | 6/2003 | Harmon et al. | |
| 6,707,346 B2 | 3/2004 | Tillotson et al. | |
| 6,831,525 B1 | 12/2004 | Beaudin et al. | |
| 7,046,584 B2 | 5/2006 | Sorrells et al. | |
| 7,212,075 B2 | 5/2007 | Young et al. | |
| 7,230,543 B2 | 6/2007 | Minto et al. | |
| 7,660,201 B2 | 2/2010 | Fleure et al. | |
| 2002/0193947 A1 | 12/2002 | Chamberlain | |
| 2004/0105341 A1 | 6/2004 | Chamberlain et al. | |
| 2005/0007259 A1 | 1/2005 | Minto et al. | |
| 2005/0007887 A1 | 1/2005 | Sorrells et al. | |
| 2005/0012561 A1 | 1/2005 | Young et al. | |
| 2005/0047275 A1 | 3/2005 | Chamberlain et al. | |
| 2005/0122839 A1 | 6/2005 | DiFoggio et al. | |
| 2005/0285645 A1 | 12/2005 | Hall et al. | |
| 2006/0146646 A1 | 7/2006 | Fanini et al. | |
| 2006/0192625 A1 | 8/2006 | Sorrells et al. | |
| 2010/0034053 A1 | 2/2010 | Fleure et al. | |

* cited by examiner

*Primary Examiner* — Isam Alsomiri
*Assistant Examiner* — James Hulka
(74) *Attorney, Agent, or Firm* — Woods Patent Law

(57) ABSTRACT

A method of deploying a seismic recorder array on a seafloor is disclosed. The seismic recorder array comprises a plurality of removable seismic data recorders. The method comprises the step of forming the seismic recorder array by connecting a plurality of recorder housings in series, wherein adjacent recorder housings are connected by a connector cable. The recorder housings are configured to retain the removable seismic data recorders. The method comprises the step of loading the plurality of removable seismic data recorders in the recorder housings, and lowering the seismic recorder array into water until the seismic recorder array is positioned on the seafloor underlying the water. The method comprises the step of operating the seismic data recorders to detect seismic signal reflections and to record seismic data representing the reflections.

20 Claims, 6 Drawing Sheets

METHOD FOR DEPLOYMENT OF SEISMIC RECORDER ARRAY WITH REMOVABLE DATA RECORDERS

BACKGROUND OF THE INVENTION

1. Field of the Invention

The invention relates generally to seismic exploration. More particularly, the invention relates to a method for deployment of a seismic recorder array with removable data recorders and acquisition of marine seismic data.

2. Description of the Related Art

Marine seismic exploration utilizes acoustic energy source generators for transmitting acoustic energy (also referred to as seismic energy) through subsurface geologic formations. The acoustic energy is transmitted along shot lines in the desired survey region. The transmitted acoustic energy propagates downwardly through the subsurface as acoustic waves (also referred to as seismic waves or signals). The transmitted acoustic waves are reflected by the subsurface formations and boundaries. The reflected acoustic waves propagate upwardly and are detected with hydrophones or geophones. Data from adjacent shot lines are processed to construct an image of the subsurface geologic formations.

In marine seismic exploration, a marine vessel is used to deploy seismic data recorders to the seafloor. In one existing method, a marine vessel tows one or more seismic streamer cables along a selected survey line. Each streamer contains multiple hydrophones which receive the reflected seismic waves. The hydrophones are wired together in receiver groups spaced along the streamer. In another existing method, interconnected seismic data recorders are placed directly on the seafloor. The seismic data recorders are interconnected by reinforced cables that provide power and transmit data from the seismic data recorders to a remote storage device. Because this system relies on cables for power and data transmission, any damage to the cables or connectors prevents the recording of data and contributes significant downtime and increased survey cost while the system is retrieved, repaired and redeployed. Also, the data and power cables add significant weight to the system which, combined with the reliability concerns, effectively prevents such systems from being deployed in deep water.

U.S. Pat. No. 6,024,344 to Buckley et al. discloses a system wherein autonomous nodal recorders are attached to a main cable by individual tethers. The tethers can wrap around and get tangled in the main cable during deployment and potentially compromise data quality. Also, because the seismic recorders attach to the main cable only at a single point, the recorders will land on the ocean bottom at a completely random orientation relative to the other recorders and the survey geometry in general.

SUMMARY OF THE INVENTION

A method of deploying a seismic recorder array on a seafloor is disclosed. The seismic recorder array comprises a plurality of removable seismic data recorders. The method comprises the step of forming the seismic recorder array by connecting a plurality of recorder housings in series, wherein adjacent recorder housings are connected by a connector cable. In one embodiment, the connector cables are removably attached to the recorder housings.

The recorder housings are configured to retain the removable seismic data recorders. The method comprises the step of loading the plurality of removable seismic data recorders in the recorder housings, and lowering the seismic recorder array into water until the seismic recorder array is positioned on the seafloor underlying the water.

The method comprises the step of operating the seismic data recorders to detect seismic signal reflections and to record seismic data representing the reflections. In one embodiment, the seismic data recorders are activated and synchronized prior to deployment on the seafloor.

In one embodiment, the series connected recorder housings are stored in a spool or a cable engine. The spool or the cable engine is supported by a barge or a vessel. Alternatively, the recorder housings may be stored separately or laid out on a deck.

The method further comprises deploying the seismic recorder array to the seafloor as the barge or the vessel moves through water. The connector cables are made from a pliable metallic, non-metallic or composite material. The connector cables define the interval between adjacent data recorders.

BRIEF DESCRIPTION OF THE DRAWINGS

For detailed understanding of the invention, reference is made to the following detailed description of the preferred embodiments, taken in conjunction with the accompanying drawings in which reference characters designate like or similar elements throughout the several figures of the drawings.

DETAILED DESCRIPTION OF THE EMBODIMENTS

Figure 1:
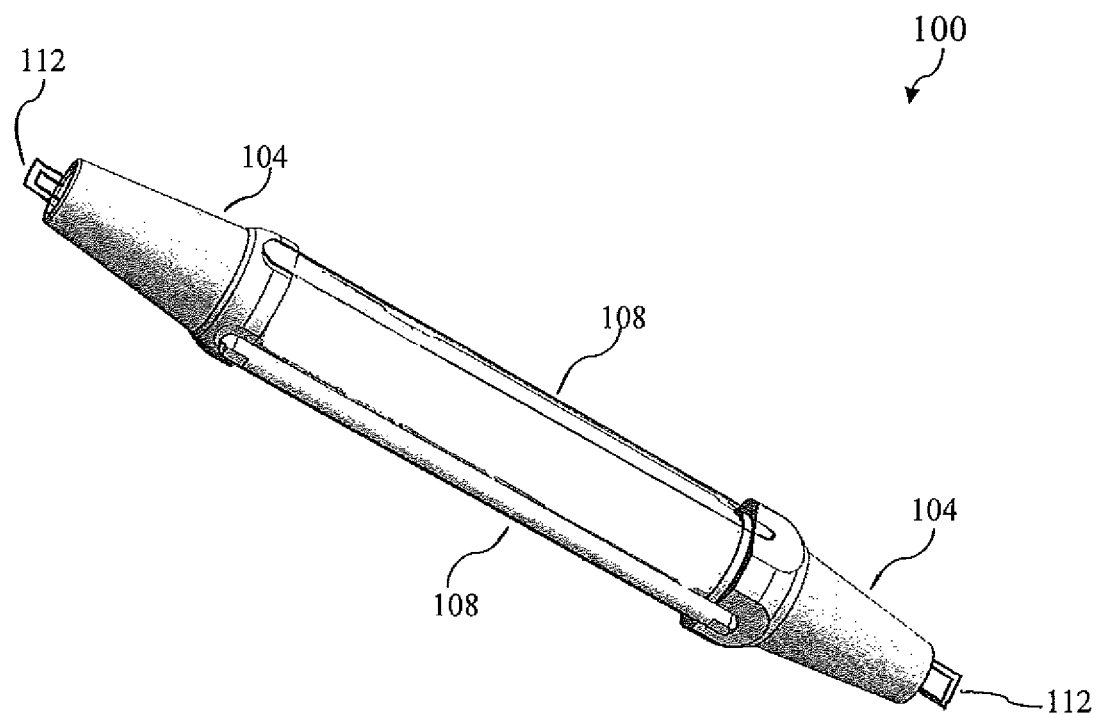
FIG. 1 illustrates a recorder housing in accordance with one embodiment.

FIG. 1 illustrates a recorder housing 100 (also referred to as recorder shell or recorder assembly 100) in accordance with one embodiment. The recorder housing 100 is essentially a shell configured to securely retain a removable seismic data recorder (not shown in FIG. 1). In one embodiment, the recorder housing 100 comprises two end caps 104 joined by one or more linking rods 108. In one implementation, the recorder housing 100 comprises two end caps 104 joined by three linking rods 108, thus creating a triangular-shaped frame. The end caps 104 may be conical-shaped as illustrated. Alternatively, the end caps 104 may be circular, triangular or may have any other suitable shape.

The linking rods 108 provide structural rigidity to the recorder housing 100 and also allow the seismic data recorder to be easily installed inside, and removed from, the recorder housing 100. The linking rods 108 also assist in coupling the recorder housing 100 to the seafloor, providing stability to the recorder housing 100 when deployed to the seafloor. The end caps 104 may include a threaded portion adapted to receive a seismic data recorder having a threaded end. Alternatively, the end caps 104 may have a spring biased section to press onto the seismic data recorder when the data recorder is inserted into the recorder housing 100. The end caps 104 may employ other means to securely retain the seismic data recorder.

In one embodiment, the recorder housing 100 includes two apertures 112 for connection to adjacent recorder housing via a connector cable (not shown in FIG. 1). The apertures 112 are located at opposite ends of the recorder housing, but may be built at other locations. Alternatively, the recorder housing 100 may have rings, hooks, joints or any other suitable attachment means for connection to an adjacent recorder housing. Adjacent recorder housings are connected via a respective connector cable to form a seismic recorder array. For example, a connector cable having snap links may be disposed through the apertures 112.

In one embodiment, a connector cable is permanently attached or sealed to the recorder housing 100. For example, a connector cable may be permanently attached or sealed to the end caps, thus eliminating the need for the apertures 112. By permanently attaching or sealing the connector cables to the recorder housing, the seismic recorder array thus formed may be relatively easily stored.

Figure 2:
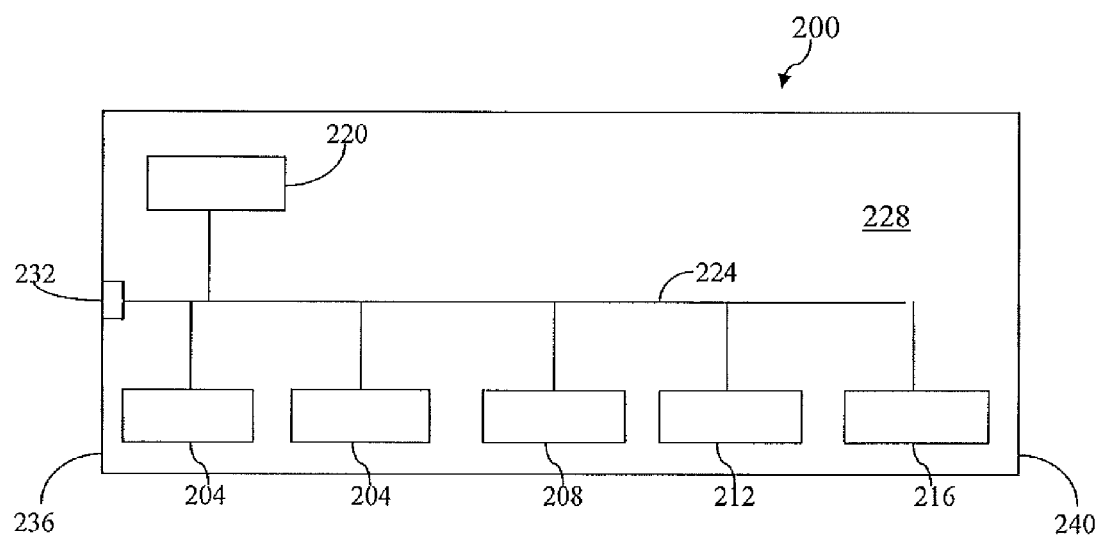
FIG. 2 illustrates a seismic data recorder in accordance with one embodiment.

FIG. 2 illustrates a removable seismic data recorder 200 in accordance with one embodiment. The seismic data recorder 200 generally includes one or more seismic energy sensors 204 capable of sensing reflected seismic energy (i.e., seismic waves). The seismic energy sensors 204 are preferably geophones, hydrophones or other sensor devices known in the art. The seismic recorder 200 includes a control circuit 208 for controlling the operation of the sensors 204. One or more storage devices 212 connected to the sensors 204 store data representative of recorded reflected seismic energy. One or more clocks 216 apply timing signals to the sensors 208 and provide time stamp to the recorded data.

A power supply 220 provides electrical power to the sensors 204, the control circuit 208 and the storage devices 212. A bus 224 may distribute power from the power supply 220 to the individual components. The bus 224 may also facilitate transmission of data and clock signals. For example, the bus 224 may be used to apply clock signals to the storage devices 212 and may be used to transfer recorded data from the storage devices 212.

The individual components of the seismic recorder 200 are enclosed in a housing 228. The housing 228 is sealed and pressure-resistant to withstand water pressure on the seafloor. The housing 228 may be made from steel, titanium, composite, or other suitable material. In one implementation, an external plug 232 is incorporated into the housing 228. The plug 232 is electrically connected to the bus 224. The power supply 220 can be recharged via the plug 232. Also, data from the storage devices 212 can be downloaded via the plug 232.

In one embodiment, the seismic recorder 200 utilizes induction charging method to recharge the power supply 220, thereby eliminating the need for the external plug 232. It will be appreciated that by utilizing induction charging method, the seismic recorder 200 can be entirely sealed since there will be no longer a need for the external cable 232. In one implementation, recorded data from the storage devices 212 may be downloaded via infra-red transmission, laser transmission or other manner of wireless transmission.

The housing 228 has a generally cylindrical body with opposite end portions 236 and 240. It will be understood that the housing 228 may have any other shape suitable for installation in the recorder shell 100.

Figure 3:
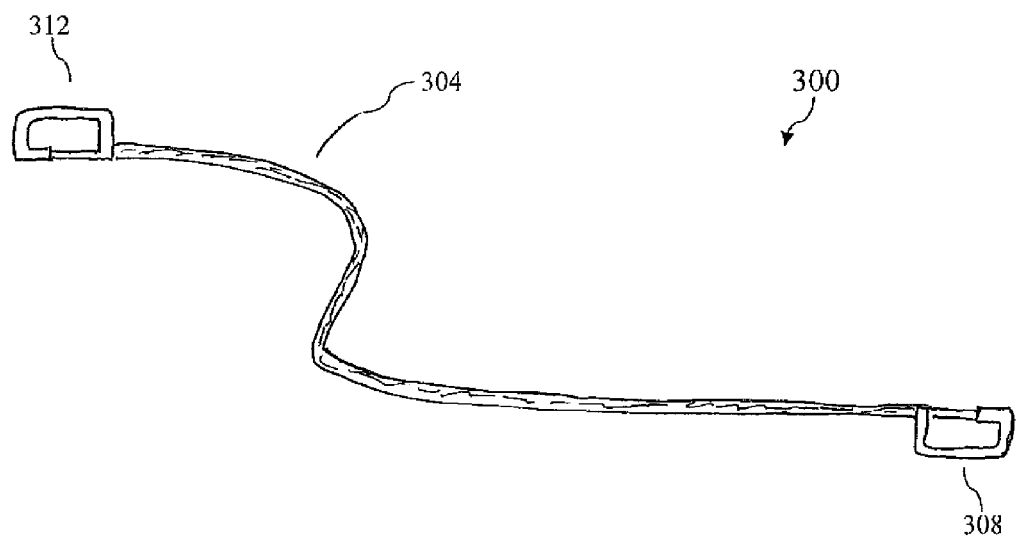
FIG. 3 illustrates an exemplary connector cable for interconnecting two recorder housings.

FIG. 3 illustrates an exemplary connector cable 300 used to interconnect two recorder shells 100. In the illustrated embodiment, the connector cable 300 includes a non-metallic rope segment 304 with two snap links 308 and 312 at opposite ends. It should be understood that, while the segment 304 is shown in the form of a non-metallic rope, it may also take the form of a metallic cable, coated cable, chain, or similar element. In addition, the connector cable 300 may be of any desired length. Typically, the connector cables 300 are of the same length, but their lengths may differ. The snap links 308 and 312 are adapted to be attached to the apertures 112. As discussed before, in one embodiment, the connector cable 300 is permanently attached or sealed to the recorder shells, thus eliminating the need for the snap links 308. The connector cable 308 may be welded, fused or otherwise sealed to the recorder housing 100. In one implementation, the connector cable may be semi-permanently secured (i.e., removably secured) or attached to the recorder housing. For example, the connector cable may be pinned to the recorder housing.

Figure 4:
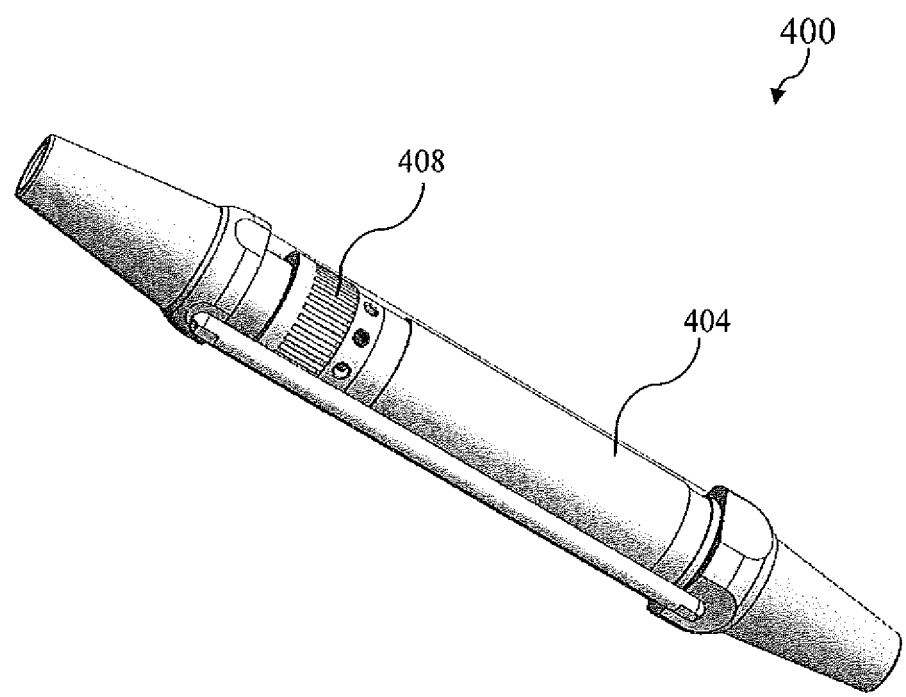
FIG. 4 illustrates a fully assembled seismic recorder housing with a seismic data recorder.

FIG. 4 illustrates a fully assembled seismic recorder housing 400 with a removable seismic data recorder 404. The data recorder 404 includes a spring biased section 408, which is compressed prior to insertion of the data recorder 404 into the recorder housing 400. Once the data recorder 404 is inserted inside the recorder housing 400, the spring biased section 408 expands to firmly secure the data recorder 404 to the recorder housing 400. Thus, the spring biased section 408 provides a quick insertion and release mechanism for the data recorder 404. The data recorder 404 can be installed in the recorder housing 400 prior to deployment to the seafloor. After retrieval from the seafloor, the data recorder 404 can be removed from the recorder housing in order to extract recorded seismic data.

Figure 5:
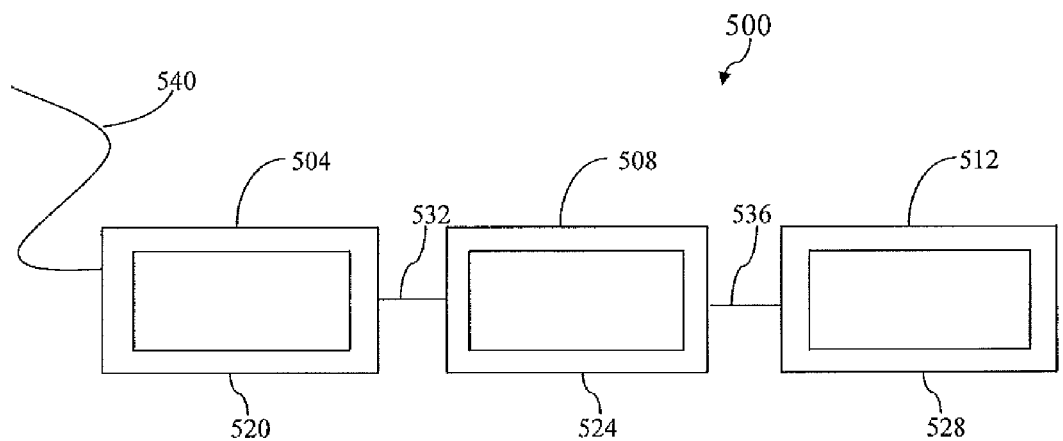
FIG. 5 illustrates a seismic recorder array in accordance with one embodiment.

FIG. 5 illustrates a seismic recorder array 500 in accordance with one embodiment. The seismic recorder array 500 comprises seismic recorder housings 504, 508 and 512 connected in series; specifically, the adjacent housings 504 and 508 are connected via a connector cable 532 and the adjacent housings 508 and 512 are connected via a connector cable 536. In one embodiment, the connector cables 532 and 536 are permanently sealed or attached to the seismic recorder housings. It will be appreciated that additional seismic recorder housings will be connected in the aforementioned manner to the seismic recorder array 500. In one embodiment, snap links or other types of detachable connectors may be utilized at selected intervals to disconnect the seismic recorder array into one or more segments.

Figure 6:
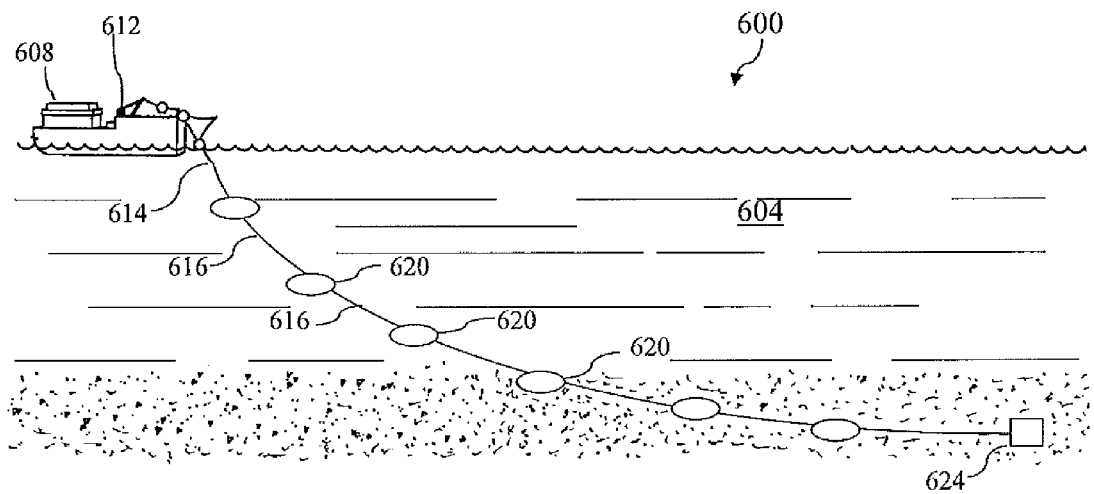
FIG. 6 illustrates a seismic recorder array being deployed on the seafloor.

FIG. 6 illustrates a seismic recorder array 600 being deployed into the sea 604 from a vessel 608. The term "sea," as used herein, is intended to refer generally to all navigable bodies of water. A cable engine or spool 612 affixed to the vessel 608 handles the deployment and retrieval of the seismic recorder array 600. The seismic recorder array 600 comprises a plurality of seismic recorder assemblies 620 connected in series via connector cables 616. The seismic recorder assemblies 620 each include a removable seismic data recorder.

Depending on the construction of the seismic data recorder, the seismic recorder array 600, with or without the seismic data recorder, may be stored in the cable engine 612. In one implementation, the seismic data recorders are installed in the recorder shells as the seismic recorder array 600 is being released by the cable engine 612. During deployment, the seismic recorder array 600 is released by the cable engine 612 as the vessel moves through the water. In one embodiment, the seismic data recorders are loaded into, and removed from, the recorder housings automatically by a loading and removal means. The loading and removal means may be implemented by a mechanical and/or an electrical system. The automatic loading and removal means greatly simplifies the loading and unloading tasks and reduces labor costs associated with the loading and unloading tasks.

In one embodiment, the data recorders are activated and synchronized and thereafter the seismic recorder array 600 is lowered to a desired position on the seafloor. During retrieval, the cable engine 612 reels in the seismic recorder array 600. In one embodiment, as the seismic recorder array 600 is retrieved from the seafloor, the seismic data recorders are removed from the recorder shells. Recorded data from the seismic data recorders is then downloaded via infra-red, laser or other transmission means.

An anchor 624 may be attached to the seismic recorder array 600. The anchor 624 could take the form of a chain or other suitable weighted object. The anchor 624 is placed into the water 604 and allowed to sink toward the seafloor. Thereafter, as the vessel 608 moves along the planned path of the recorder array 614, the seismic recorder array 614 is reeled out of the cable engine 612 and placed into the water 604 and allowed to sink toward the seafloor. The speed of the vessel 608 and the points at which the recorder assemblies and connector cables are placed in the water are set to facilitate the units landing on the bottom at a desired position and interval.

Figure 7:
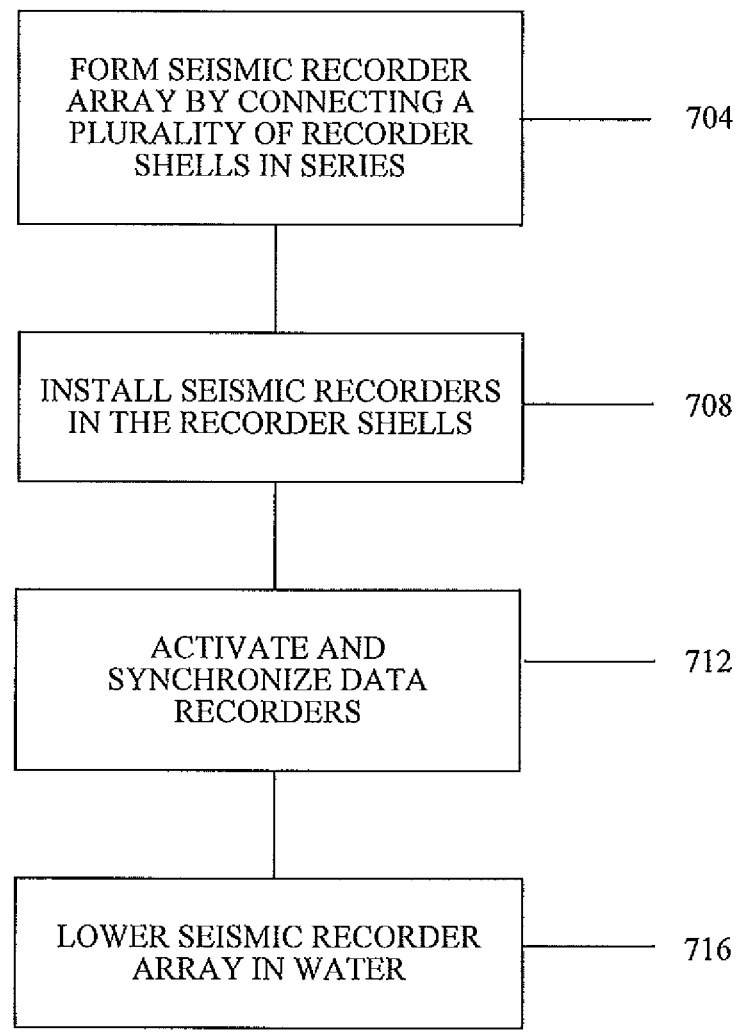
FIG. 7 is a flow diagram of method steps of deploying a seismic recorder array on the seafloor in accordance with one embodiment.

FIG. 7 is a flow diagram of method steps of deploying a seismic recorder array on the seafloor in accordance with one embodiment. In step 704, a seismic recorder array is formed by connecting a plurality of recorder housings in series. As explained before, adjacent recorder housings are connected by a respective connector cable.

In step 708, seismic data recorders are installed in the recorder housings. As discussed before, the seismic data recorders are removable-types that can be installed in the recorder housings prior to deployment and may be removed from the housings after retrieval from the water. In one implementation, the seismic recorder array is stored in a cable engine or spool. As the seismic recorder array is reeled out of the cable engine, the seismic data recorders are installed in the recorder housings. In step 712, the seismic data recorders are activated and synchronized. In step 716, the seismic recorder array is lowered into the water until the seismic recorder array is positioned on the seafloor underlying the water.

Figure 8:
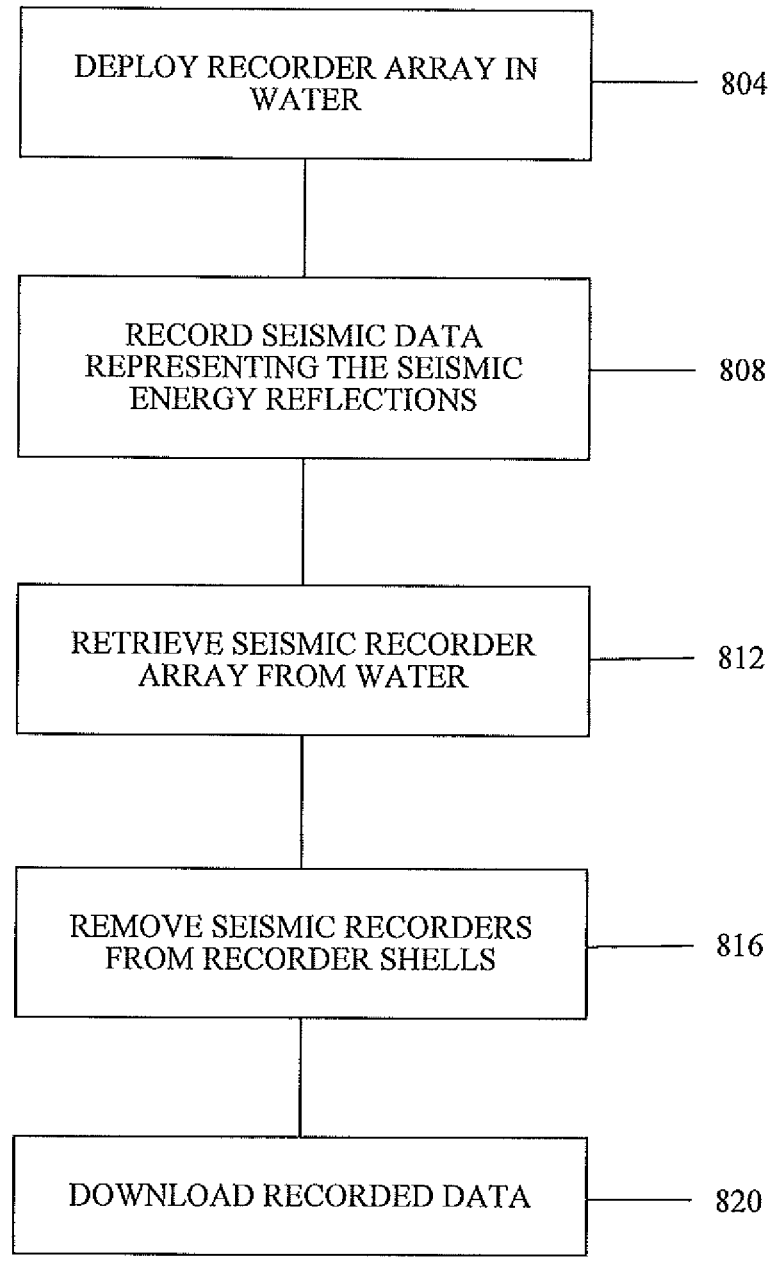
FIG. 8 is a flow diagram of the steps of acquiring seismic signal reflections.

FIG. 8 is a flow diagram of the steps of acquiring seismic signal reflections. In step 804, the seismic recorder array is deployed to the seafloor by the aforementioned steps as a vessel or barge moves through the water. As discussed before, a cable engine or spool releases the seismic recorder array during the deployment.

In step 808, seismic data representing the seismic energy reflections are recorded by the seismic data recorders. As discussed before, data representing the seismic energy reflections are stored in storage devices shown in FIG. 2.

In step 812, the seismic recorder array is retrieved from the seafloor. The seismic recorder array is reeled in by the cable engine during retrieval. In step 816, the seismic data recorders are removed from the recorder shells. In step 820, the recorded data is downloaded from the seismic data recorders.

It will also be appreciated that one or more of the elements depicted in the drawings/figures can also be implemented in a more separated or integrated manner, or even removed or rendered as inoperable in certain cases, as is useful in accordance with a particular application.

As used in the description herein and throughout the claims that follow, "a," "an" and "the" include plural references unless the context clearly dictates otherwise. Also, as used in the description herein and throughout the claims that follow, the meaning of "in" includes "in" and "on" unless the context clearly dictates otherwise.

The foregoing description of illustrated embodiments of the present invention, including what is described in the Abstract, is not intended to be exhaustive or to limit the invention to the precise forms disclosed herein. While specific embodiments of, and examples for, the invention are described herein for illustrative purposes only, various equivalent modifications are possible within the spirit and scope of the present invention, as those skilled in the relevant art will recognize and appreciate. As indicated, these modifications may be made to the present invention in light of the foregoing description of illustrated embodiments of the present invention and are to be included within the spirit and scope of the present invention.

Thus, while the present invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the present invention. It is intended that the invention not be limited to the particular terms used in following claims and/or to the particular embodiment disclosed as the best mode contemplated for carrying out this invention, but that the invention will include any and all embodiments and equivalents falling within the scope of the appended claims. Thus, the scope of the invention is to be determined solely by the appended claims.

What is claimed is:

1. A method of deploying an underwater seismic recorder array on a seafloor underlying a navigable body of water, the array forming a seismic recording cable, the cable comprising a plurality of connector cables, a plurality of removable autonomous seismic data recorders, and a plurality of seismic data recorder housings, each of the seismic data recorders being independently powered and removably contained within a respective recorder housing corresponding thereto, each housing having opposing ends, each of the connector cables comprising opposing ends, the seismic data recorders and corresponding housings being arranged and configured in serial mechanical fashion along the cable such that one connector cable is disposed between every two adjoining housings disposed along the cable, each one such connector cable being attached to corresponding ends of the two adjoining housings, the method comprising:
   loading the plurality of removable seismic data recorders in the recorder housings of the seismic recording cable, and
   lowering the seismic recording cable into the water until the seismic recorder array is positioned on the seafloor.

2. The method of claim 1, further comprising assembling the seismic recording cable by mechanically connecting in serial fashion the plurality of recorder housings to one another with the connecting cables, the connecting cables comprising detachable connectors.

3. The method of claim 1, further comprising disassembling the seismic recording cable by mechanically disconnecting the plurality of recorder housings from one another by removing the connecting cables, the connecting cables comprising detachable connectors.

4. The method of claim 1, further comprising raising the seismic recording cable from the seafloor and out of the water.

5. The method of claim 4, further comprising removing at least some of the seismic data recorders from their respective housings.

6. The method of claim 1, further comprising operating the seismic data recorders to record seismic data.

7. The method of claim 1, wherein the seismic recording cable is stored in a spool or a cable engine.

8. The method of claim 7, wherein the spool or the cable engine is supported by a barge or a vessel.

9. The method of claim 8, further comprising deploying the seismic recording cable onto the seafloor as the barge or the vessel moves through water.

10. The method of claim 7, wherein the spool or the cable engine comprises means for releasing the seismic recording cable for deployment on the seafloor.

11. The method according of claim 1, wherein the connector cables are made from a pliable metallic, non-metallic or composite material.

12. The method of claim 1, wherein the connector cables define an interval between adjacent seismic data recorders.

13. The method of claim 1, wherein the connector cables are permanently attached to the recorder housings.

14. The method of claim 1, wherein the connector cables are removably attached to the recorder housings.

15. The method of claim 1, further comprising connecting a floatable marker to at least one of the recorder housings.

16. The method of claim 1, further comprising identifying locations of the seismic data recorders before the recorders are operated to record seismic data.

17. The method of claim 1, further comprising identifying the orientations of the seismic data recorders before the recorders are operated to record seismic data.

18. The method of claim 1, further comprising automatically loading the seismic data recorders into the recorder housings automatically.

19. The method of claim 1, further comprising automatically removing the seismic data recorders from the recorder housings automatically.

20. The method of claim 1, further comprising automatically loading the seismic data recorders into the recorder housings using a loading means prior to deployment of the seismic recording cable on the seafloor.

* * * * *